Jan. 18, 1966 W. H. BACH 3,229,879
CLAW FOR HIGH SPEED INTERMITTENT MOVEMENT MECHANISM
Filed Jan. 11, 1963
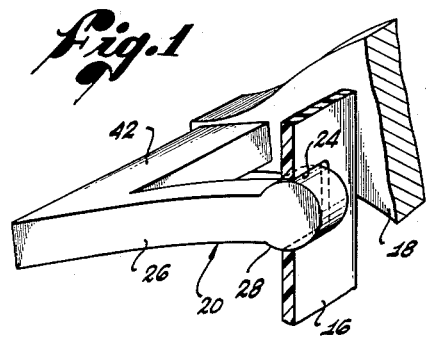
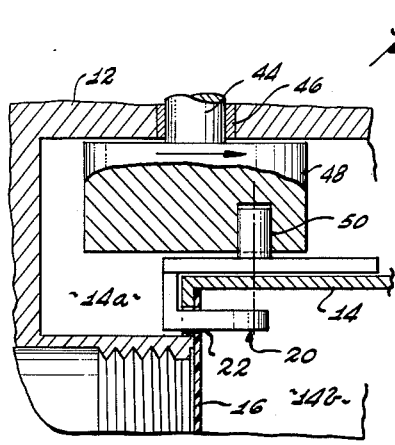
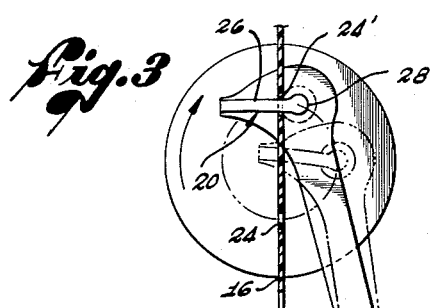
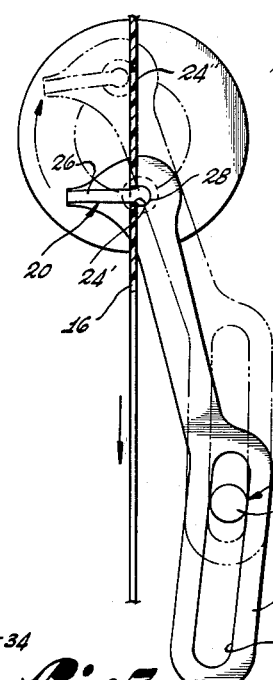
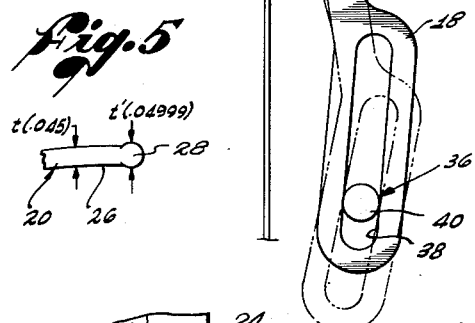
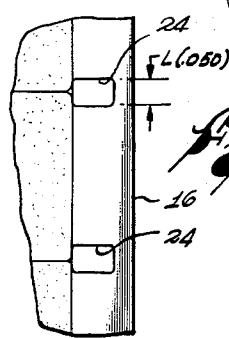
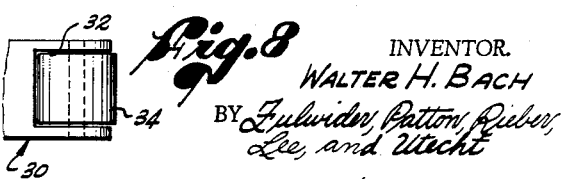
INVENTOR.
WALTER H. BACH
BY Fulwider, Patton, Rieber, Lee, and Utecht
ATTORNEYS

United States Patent Office 3,229,879
Patented Jan. 18, 1966

3,229,879
CLAW FOR HIGH SPEED INTERMITTENT MOVEMENT MECHANISM
Walter H. Bach, Los Angeles, Calif., assignor to Bach Auricon, Inc., Los Angeles, Calif., a corporation of California
Filed Jan. 11, 1963, Ser. No. 250,927
8 Claims. (Cl. 226—67)

This invention relates generally to intermittent movement mechanisms for motion picture cameras, projectors, and the like, and more particularly to an improved claw for high speed mechanisms of this type.

Conventional cinematography (or projection) involves a cyclic film movement, each cycle of which includes a "pull down" period during which the film is advanced by a claw engaging a sprocket perforation and a "dwell" period during which the film remains stationary and is exposed.

For most efficient exposure it is, of course, desirable that the "dwell" portion be as long as possible compared to the pull down portion. This entails moving the film at a high rate of speed from a standing start during the pull down period. The requirement of fast pull down presents numerous problems, particularly in high speed photography, where the entire film movement cycle is a small fraction of a second.

Due to the construction and operation of present high speed movement mechanisms of the subject type, the film tends to coast a slight and indeterminate amount at the termination of each successive pull down. By way of explanation, the claw of a conventional mechanism is usually smaller than the perforation it engages for reasons to be considered below. Further, it will be appreciated that inertia is developed in the film and in the movable parts of the mechanism during pull down. Since the claw is undersize, a certain amount of this inertia is allowed to remain at the instant the pin is withdrawn from the perforation, resulting in the film coasting and inaccurate indexing of the film. It is to be noted that, although the extent of coasting may be somewhat reduced by moving the claw in a path substantially normal to the film at the instant of disengagement, as compared to other movement paths, this is not the complete solution to the problem. As long as the claw is undersized, some coasting still takes place.

Another expedient sometimes resorted to is the use of a separate pin to index the film. Such expedient is undesirable, however, since it adds greatly to the complexity of the mechanism and also increases the wear on film sprocket holes.

In order to limit the effect of coasting one expedient other than that of moving the claw in a path substantially normal to the film at the instant of disengagement, has been to limit the open period of the camera shutter to that portion of the dwell during which the film is actually stationary. This obviously results in a corresponding reduction in the exposure efficiency of the camera and for this reason is generally unsatisfactory. Furthermore, it does not completely solve the alignment problem.

Another consideration which must be borne in mind in the design of an optimum intermittent movement mechanism is the disadvantage of excessive "sawing" of the claw on the edges of the film perforations during pull down movement of the film. This condition not only causes wear on the perforations and occasionally actual tearing of the film, but also results in the emulsion of the film being scraped off by the claw and accumulating thereon and within the film race of the camera. Such accumulation of emulsion, in turn, generally decreases the efficiency of the mechanism interfering with the optical system and may eventually even cause scratching of the film. The above described sawing tendency is more pronounced in a situation where the claw fits tightly into the sprocket perforation, thus making such tight fitting claws undesirable as an expedient to prevent coasting.

Thus, by way of summary, it may be said that on the one hand, it is desirable that the claw fit tightly in the film perforation to accurately index the film for exposure, while on the other hand, it is desirable that a considerable degree of freedom be provided in order to preclude excessive sawing during insertion and withdrawal of the claw from the perforation.

Having in mind the foregoing discussion, it is a major object of the present invention to provide an intermittent film transport mechanism embodying an improved claw, which substantially fills the perforations at the instant of disengaging the film so as to index the film precisely, yet which does not subject the film to excessive sawing during pull down.

It is also an object of the invention to provide an intermittent film transport mechanism, in which the same claw is used both for pull down and for indexing the film.

Another object of this invention is to provide a film transport mechanism of the type described, which is simple in construction, dependable, and exceptionally quiet in operation.

It is a further object of the invention to provide an intermittent mechanism of the type described, which is capable of accomplishing all of the above objects, yet which is simple in construction and inexpensive to manufacture.

These and other objects, features, and advantages of the invention will be better understood by referring to the following detailed description taken in conjunction with the accompanying drawings, in which:

FIGURE 1 is a perspective view of the mechanism of the invention, illustrating the improved claw at the instant of engaging or disengaging the film;

FIGURE 2 is a horizontal section through a camera mounting the mechanism of the invention in which portions of the mechanism are shown in section and other portions are shown in plan;

FIGURE 3 is a side elevation view, illustrating the mechanism during the pull down period, the claw being shown in full lines just after it has entered the film perforation and in phantom lines at approximately the midpoint of the pull down movement;

FIGURE 4 is a view similar to FIGURE 3 showing the claw in full lines as it disengages the film and in phantom lines just before it enters the next successive film perforation to initiate another pull down movement;

FIGURE 5 is an elevation view of the improved claw, as constructed for use in conjunction with standard 16 mm. film;

FIGURE 6 is a cross view showing certain dimensions of the film perforation of standard 16 mm. film;

FIGURE 7 is an elevation view of a modified version of the claw; and

FIGURE 8 is a plan view of the modified claw illustrated in FIGURE 7.

In the drawings, the illustrated mechanism, including the improved claw, is indicated generally by the reference numeral 10. For purposes of illustration, the mechanism 10 is shown embodied in a camera including a case 12 with a vertical partition 14 separating it into a closed section 14a containing the major portion of the mechanism and a section 14b to house the film 16. To simplify the description, the invention is set forth independently of any particular shutter mechanism arrangement of lenses and the like, it being apparent how the mechanism 10 can be incorporated in a suitable design with such camera units.

The mechanism 10 includes basicaly an oscillative claw arm 18 with the improved claw 20 on its distal end. In operation, the claw 20 projects through a vertical slot 22 in the front wall of the partition 14 to intermittently engage and pull down the film, frame by frame, through the optical film gate (not shown) where exposure takes place.

Although the mechanism 10 is described in conjunction with a camera, it will be understood that the same inventive concepts apply in the case of a projector.

Conventional film 16 for use in a camera of the subject type has perforations 24 along at least one of its edges. By way of definition, the "length" of a given film perforation is considered to be the distance measured longitudinally of the film between the opposed edges of a given perforation, as indicated by the dimension L in FIGURE 6. Similarly, the "width" of a perforation is considered to be measured transversely of the film. In the case of 16 mm. film, which has been chosen for illustration, the distance L is equal to 0.050" and there is, as shown, one perforation for each frame.

It will be recalled from the introductory discussion that it is desirable on the one hand to have the claw 18 completely fill the length of the film perforation 24 in order to accurately index the film, while on the other hand, it is desirable that there be a degree of clearance between the claw 20 and the upper and lower edges of a given perforation during actual pull down in order to prevent excessive sawing.

In the present case, these apparently conflicting requirements are met by making the claw 20 with a relatively narrow rear body portion 26 and a bulbous nose 28. As illustrated in FIGURE 5, the body portion 26 is of a thickness T substantially less than the length of the perforation 24. In contrast, the nose 28 has a thickness T' adjacent its tip, which is substantially equal to, but no greater than, the length of the perforation.

As constructed for use in conjunction with 16 mm. film, making the dimension T equal to approximately 0.045" and the dimension T' equal to 0.0499", as indicated in FIGURE 5, has been found to afford particularly advantageous results. The width of the claw 20 is sufficiently undersize that it will fit freely into the perforation 24 without interference or friction.

Preferably, though not necessarily, the nose 28 is generally circular in vertical cross section. As may be seen in FIGURES 1 and 3, it joins the body portion 26 over a section of circumference defined by a sector of approximately 120° extent.

The body portion 26, on the other hand, is preferably slightly upwardly arcuate in overall shape with its upper and lower walls being defined by circular curves having a common center of curvature. Such an arcuate shape is advantageous in that it compensates for rocking movement of the claw with respect to the horizontal, and thereby precludes an undesirable angular force from being applied to the film during pull down.

In a modified claw 30, illustrated in FIGURES 7 and 8, the body portion 31 is bifurcated at its forward end, as at 32, for mounting a cylindrical roller 34 as its bulbous nose. As may be seen, the roller 34 is arranged for rotation about a generally horizontal axis. The diameter of the roller is, as in the case of the maximum thickness of the nose portion 28, substantially equal to, but no greater than, the length of the film perforation 24. The advantage of this particular embodiment is that the roller 34 may rotate relative to the body portion 31, thus minimizing the frictional force applied to the film perpendicular to its surface, as the roller enters and leaves the perforation 24.

The remainder of the mechanism 10 for moving the claw 20 (or 30) in a desired motion path includes the elongated claw arm 18, which is mounted in the closed section 14a of the case 12 at a location alongside of the perforate edge of the film 16. The arm is arranged generally vertically and is attached adjacent its lower end by a slide-pivot connection 36 to the case 12. In the present embodiment, the arm 18 is formed with a slot 38, and a pivot pin 40 is secured to the case. At its upper end, the claw arm 18 is connected to or integrally formed with the claw 20 with the parts parallel to, and alongside of, one another, the parts being joined by a member 42.

Power for oscillating the claw arm 18 is supplied by means of a rotating drive shaft 44 journaled in a bearing 46 in the case and connected at one end to a suitable power source (not shown). The drive shaft 44 secured at its other end to the crank 48 which, in turn, is rotatably connected at a location remote from the axis of the shaft 44 to the upper end of the claw arm 18, as at 50 in FIGURE 2.

Referring to FIGURE 2, it may be seen that the axis of the rotatable connection between the crank 48 and claw arm 18 and the central axis of the nose 28 are aligned with one another. Accordingly, the nose 28 of the claw 20 describes a circular motion path identical to that of the connection. As illustrated in FIGURES 3 and 4, the cooperating parts of the mechanism 10 are arranged so that the claw 20 enters and leaves the perforations 24 substantially at the upper and lower limits, respectively, of its movement.

At the time of entry and leaving, it will be appreciated that the claw 20 moves generally horizontally or normal to the film 16. Moreover, by virtue of the slide-pivot connection 36 between the claw 18 and the case 10, the claw is maintained generally horizontal during the entire period of pull down.

In operation, the drive shaft 44 rotates to move the claw 20 clockwise in the path indicated in FIGURES 3 and 4. Assuming the film 16 to have been initially positioned so that a given perforation 24' is positioned to receive the claw, the bulbous nose 28 enters that perforation at the instant it reaches the uper limit of its movement path, as illustrated in FIGURE 3. Continued rotation of the drive shaft 44 causes the claw 20 to first advance to the right in FIGURE 3 and then begin its downward movement. This mode of motion is desirable, since it distributes the acceleration and deceleration of the film substantially uniformly over the entire pull down phase of the cycle, thus requiring a minimum acceleration value for a given pull down time.

Advancement of the claw 20 to the right in FIGURE 3 toward the position indicated in phantom lines causes the body portion 26 to enter the perforation 24' just shortly after the start of the pull down movement. Since the body portion 26 is substantially undersize in thickness relative to the length of the perforation, sufficient freedom is provided in order to minimize sawing of the film by the claw. During this pull down, advancement of the film, of course, takes place to position the next frame in alignment with the optical film gate for exposure.

When the claw 20 is moved to the position shown in full lines in FIGURE 4, the pull down is completed and the period of dwell is initiated. It may be seen that, as the claw is disengaged from the film, it is moving substantially horizontally, being at the lower limit of the circular movement path. Moreover, at the instant the nose 28 is withdrawn from the perforation 24', it substantially fills the vertical extent of the latter. For these reasons, the film 16 is held stationary just at the termination of the pull down and, accordingly, a maximum dwell period is achieved. As was discussed in detail, this is highly advantageous for the reason that it provides optimum exposure efficiency and image sharpness. Another advantage is that each frame is exactly indexed with respect to its corresponding sprocket perforation and flicker or "jumping" of the projected image is minimized.

During the period of dwell, the claw 20 moves back and away from the film 16 and upwardly in a circular path toward the position indicated in phantom lines in FIGURE 4. The mechanism is arranged so that when the claw returns to the upper limit of its travel, it is aligned with and adapted to enter the next successive perforation 24″. Upon continued rotation of the drive shaft, the claw, of course, enters that perforation and proceeds to again pull down the film.

It should be noted that suitable transmission means (not shown) may be provided between the power source and the drive shaft 44, so that the latter moves at an irregular speed. This enables the claw 20 to engage and disengage the film at the top and bottom, respectively, of its circular arc and still for the pull down time of the film to be short in relation to the dwell.

Although certain embodiments of the invention have been illustrated and described in detail, it will be understood that this was only by way of illustration and that numerous changes in the construction and arrangement of the various parts are possible without departing from the spirit and scope of the invention.

I claim:

1. In an intermittent movement mechanism operable to engage and pull down motion picture film having a series of identical perforations along one of its edges, a claw comprising:
   a proximal body portion;
   and a roller of a diameter greater than the thickness of said body portion and substantially equal to the length of a film perforation measured in the direction of film movement, said roller being supported at the distal end of said body portion for rotation about a generally horizontal axis and being adapted at diametrically opposed sections on its circumference to simultaneously engage the upper and lower edges of each of said perforations as the claw disengages the film.

2. In an intermittent movement mechanism operable to engage and pull down motion picture film having a series of identical perforations along one of its edges, the combination comprising:
   a frame;
   a claw arm;
   a slide-pivot conection between the lower end of the claw arm and the frame;
   a rotatable drive shaft;
   a claw on said claw arm, said claw having an elongated rear body portion of a thickness substantially less than the length of a film perforation measured in the direction of film movement, a bulbous nose of a thickness substantially equal to, but no greater than, the length of a film perforation; and a crank on said drive shaft rotatably connected to the upper end of said claw arm for rotating said nose of said claw in a circle such that said nose enters successive perforations in said film while travelling toward and normal to said film and exits from said perforations while travelling away from and normal to said film and said elongated body portion rides freely in said perforations between said entry and exits of said nose to pull down said film in response to rotation of said drive shaft.

3. In a mechanism for intermittently moving motion picture film having a series of spaced identical perforations along one of its edges, the combination of:
   a frame;
   a claw arm mounted on said frame;
   a claw on said arm, said claw including an elongated proximal body portion of a thickness less than the length of said perforations and a bulbous nose on the distal end of said body portion and having a thickness adjacent its tip substantially equal to the length of a perforation measured in the direction of film movement;
   and means for oscillating said claw arm relative to said frame to cause said claw to first advance horizontally and enter a given perforation of the film and then to move downwardly in a circular pull down path and finally to retract in a horizontal direction to leave the last mentioned film perforation, the bulbous nose completely filling the vertical extent of the last mentioned perforation at the instants of entering and leaving the film, and the elongated body portion riding relatively free in the perforations during the balance of the pull down period.

4. The subject matter of claim 3 wherein said bulbous nose comprises a cylindrical roller rotatably mounted on said body portion.

5. In a mechanism for intermittently moving motion picture film having a series of spaced identical perforations along one of its edges, the combination of:
   a frame;
   a claw arm arranged generally vertically and for movement in a plane alongside of the perforate edge of the film;
   a slide-pivot connection between the lower end of the claw and the frame;
   a rotatable drive shaft journaled on said frame;
   a crank on said drive shaft and rotatably connected to the upper end of said claw arm;
   a claw having an elongated rear body portion of a thickness substantially less than the length of a film perforation measured in a direction of film movement and a bulbous nose of a thickness adjacent its tip substantially equal to, but no greater than, said perforation length;
   and means connecting said body portion and said claw arm in such a manner that rotation of the crank by the drive shaft causes the claw first to advance and then to move downwardly in a pull down path which is substantially the arc of the circle having a movement identical to that of the connection between said crank and said claw arm and finally to retract and move through a return path spaced rearwardly of its pull down path to reach the final position, said claw completely filling the vertical extent of said perforations at the instants of entering and leaving the film and riding relatively free in the perforations during the balance of the pull down period.

6. In an intermittent movement mechanism operable to engage and pull down motion picture film having a series of identical perforations along one of its edges, the combination of:
   a claw having an elongated rear body portion of a a thickness substantially less than the length of a film perforation measured in the direction of film movement and a bulbous nose of a thickness adjacent its tip substantially equal to, but no greater than, said perforation length
   and means for rotating said nose in a circle such that said nose enters and exits successive perforations in said film in directions normal to the direction of film travel and said elongated rear body portion rides freely in each perforation between successive entries and exits of said nose to pull down said film.

7. In a mechanism for intermittently moving motion picture film having a series of spaced identical perforations along one of its edges, the combination of:
   a claw having a bulbous nose of a thickness substantially equal to, but no greater than, the length of a film perforation measured in a direction of film movement;
   a rotatable drive shaft;
   and a crank on said drive shaft rotatably connected to said claw for rotating said nose in a circle with rotation of said drive shaft such that said nose enters and exits successive perforations in said film in directions normal to the direction of film travel.

8. In a mechanism for intermittently moving motion picture film having a series of spaced identical perforations along one of its edges, a combination of:
   a claw having an elongated rear body portion of a thickness substantially less than the length of a film perforation measured in a direction of film movement and a bulbous nose of a thickness adjacent its tip substantially equal to, but no greater than, said perforation length;
   a rotatable drive shaft;
   and a crank on said drive shaft rotatably connected to said claw for rotating said nose in a circle with rotation of said drive shaft such that said nose enters and exits successive perforations in said film in directions normal to the direction of film travel and said elongated rear body portion rides freely in each perforation between successive entries and exits of said nose to pull down said film in response to rotation of said drive shaft.

References Cited by the Examiner
FOREIGN PATENTS

| | | |
|---|---|---|
| 685,066 | 12/1939 | Germany. |
| 422,576 | 1/1935 | Great Britain. |
| 425,924 | 3/1935 | Great Britain. |
| 469,894 | 8/1937 | Great Britain. |

ROBERT B. REEVES, *Primary Examiner.*

RAPHAEL M. LUPO, *Examiner.*